United States Patent [19]
Cohen et al.

[11] 3,771,044
[45] Nov. 6, 1973

[54] BROAD BAND FREQUENCY DOUBLER AND LIMITER UTILIZING MAGNETO-RESISTIVE EFFECT IN A ROTATING MAGNETIC FIELD

[75] Inventors: Leonard D. Cohen, Brooklyn, N.Y.; Brian A. Shortt; Michael J. Urban, both of Framingham, Mass.

[73] Assignee: GTE Laboratories Incorporated, Waltham, Mass.

[22] Filed: Feb. 21, 1973

[21] Appl. No.: 334,347

[52] U.S. Cl............ 321/69 NL, 307/309, 323/94 R, 338/32 R, 324/46
[51] Int. Cl. .......................................... H02m 5/00
[58] Field of Search ................ 321/69 NL; 307/309; 323/94 R, 94 H, 44 F; 338/32 R, 32 H; 324/43, 46; 340/174 R; 330/4.8

[56] References Cited
UNITED STATES PATENTS
| | | | |
|---|---|---|---|
| 3,160,863 | 12/1964 | Partovi et al. ...................... | 323/44 F |
| 3,179,864 | 4/1965 | Kramer ............................. | 323/94 H |
| 3,271,665 | 9/1966 | Castro et al. ........................ | 324/43 |

Primary Examiner—Gerald Goldberg
Attorney—Irving M. Kriegsman

[57] ABSTRACT

Apparatus for frequency doubling and limiting over a broad band of frequencies by using a magneto-resistive effect in a magnetic film. The apparatus includes a thin plate of magneto-resistive, ferromagnetic material immersed in an electronically generated rotating magnetic field. In operation, an external source provides a constant DC current through the plate. When a signal at frequency $f_1$ is impressed at the input terminals of the coils generating the rotating magnetic field, a signal at frequency $2 f_1$ appears at the output terminals of the magneto-resistive element. As the frequency of the input drive signal is changed, the output signal will continuously follow the input signal but at double the frequency without the use of an output filter. The amplitude of the output signal is directly proportional to the magnitude of the impressed DC current and to the magnitude of the spatial magneto-resistance effect in the plate. At sufficiently large input levels, the amplitude of the output signal will remain constant with input signal level. The device is capable of functioning as a frequency doubler and limiter on a frequency range from sub-audio to VHF.

9 Claims, 2 Drawing Figures

PATENTED NOV 6 1973  3,771,044

BROAD BAND FREQUENCY DOUBLER AND LIMITER UTILIZING MAGNETO-RESISTIVE EFFECT IN A ROTATING MAGNETIC FIELD

BACKGROUND OF THE INVENTION

1. Field of the Invention

The present invention relates to magneto-responsive devices and more particularly to a device which doubles an input frequency by making use of a magneto-resistive effect of a magnetic film.

2. Description of the Prior Art:

In the prior art, rotating magnetic field frequency doubler systems were characterized by a four terminal arrangement and system performance was limited to low output frequencies. The low frequency limitation was a consequence of the mechanical systems used to produce the rotating magnetic field at input frequency. The four terminal arrangement was characteristic of the transverse nature of the Hall effect that was being exploited. The use of four terminals on the device presents an upper limit to the degree of miniaturization that can be attained in device size.

The prior art is typified by the devices disclosed in U.S. Pat. Nos. 3,162,805 and 2,649,569. The first device, U.S. Pat. No. 3,162,805, uses the planar Hall effect, an effect in which an applied magnetic field and current and a generated electric field are all co-planar. The generated electric field is at double the frequency of a mechanically generated rotating magnetic field. The double frequency output is detected at a pair of terminals on a ferromagnetic plate which are distinct from another pair of current input terminals which are also on the ferromagnetic plate. This four terminal arrangement is required since the Hall effect being exploited produces an output voltage in a direction transvers to the impressed current flow.

In the present invention, a longitudinal Hall effect is used rather than the transverse effect described above. By use of the longitudinal planar Hall effect, the present device requires only two terminals on the ferromagnetic plate. The two terminals serve as the output terminals and the terminals to which the external constant current source is connected. The two terminal arrangement permits miniaturization of the device to a degree unattainable in a four terminal device. We have demonstrated doublers in accordance with the present invention in ferromagnetic plate dimensions as small as 0.0004 inch by 0.0004 inch.

Furthermore, the invention of U.S. Pat. No. 3,162,805 describes mechanical systems to produce the rotating magnetic field at input frequency. This type of system is inherently limited to low values of input frequency, typically of the order of 100 Hz; whereas, in the present invention, the rotating magnetic field is produced by electronic means and there are no moving parts. Accordingly, this system has an inherent frequency capability many orders of magnitude greater than those systems of the prior art. The present invention was demonstrated at an input frequency of 600 KHz and is capable of being used with input frequencies in the MHz range. Moreover, the device described in U.S. Pat. No. 3,162,805 incorporates a mechanical system which is less efficient than the electronic system used in the present invention. This is based on the fact that there are no moving parts in the present device and the ferromagnetic film can be placed in close proximity to the rotating magnetic field generator.

SUMMARY OF THE INVENTION

The present invention relates to a passive device which can function as a frequency doubler on a frequency range extending from sub-audio to VHF. This device directly converts an input signal into an output signal at twice the input frequency. Since the frequency conversion is direct, an output filter is not required. The device is also capable of functioning as an amplitude limiter since the output amplitude does not depend on applied magnetic flux. The device operation is based on the spatial magneto-resistive effect of a magnetic film.

In the present invention, the frequency doubler or doubling device does not require an output filter, and hence, is inherently more broad band in output frequency range than a conventional doubler. The doubler includes a thin plate of magneto-resistive, ferromagnetic material which is immersed in a rotating magnetic field. The magnetic field H is provided by two stationary coils which are in space and electrical quadrature. The generated rotating magnetic field is in the plane of the plate and is of sufficient strength to saturate the material. The plate can be of arbitrary shape and has two terminals which consist of an ohmic electrical contact at the edge of the plate. In operation, an external source provides a constant DC current through the plate. When a signal at frequency $f_1$ is impressed at the input terminals, the signal at frequency $2f_1$ appears at the output terminals. As the frequency of the input drive signal is changed the output signal will continuously follow the input signal but at double the frequency. The upper limit on the output frequency range is determined by the rotational switching speed of the magnetic material. Based on state of the art values of switching speed in magnetic films, the device should continuously double the input frequency on a frequency range extending from the sub-audio to the VHF region. The amplitude of the output signal is directly proportional to the magnitude of the impressed DC current and to the magnitude of the magneto-resistive effect in the film. Therefore, the present invention involves a frequency doubler, which functions without tuned circuits and similar additional circuitry, avoiding the difficulties and disadvantages normally encountered in the use of such circuits. It has no moving parts as in the prior art and hence is not frequency limited by the means previously used to generate the rotating magnetic field. The upper frequency limit of this device is determined by the inherent switching properties of the ferromagnetic film.

The features of the present invention which are believed to be novel are set forth with particularity in the attendant claims. The invention, together with further advantages thereof, may best be understood by reference to the following description taken in connection with the drawings. In the several figures, like reference numerals identify like elements.

DESCRIPTION OF THE PREFERRED EMBODIMENT

Figure 1:
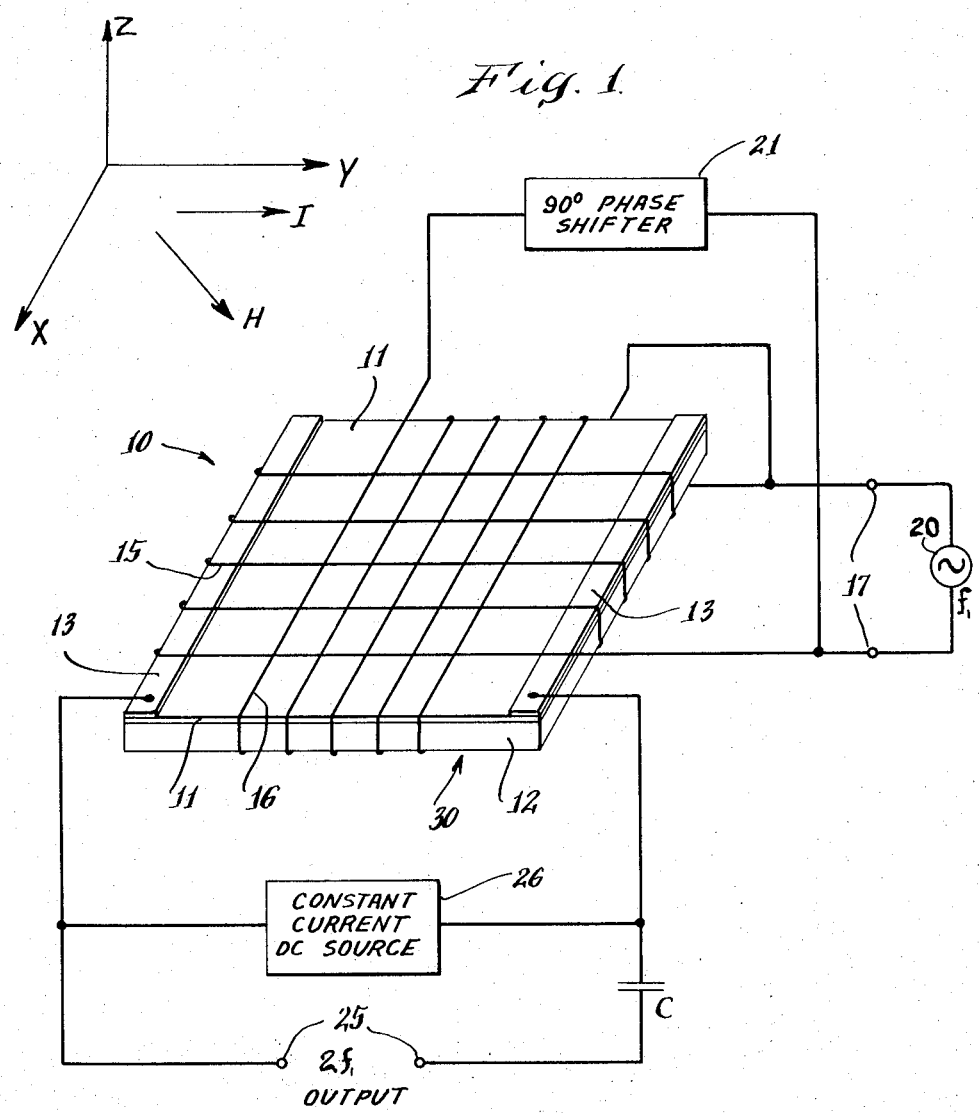
FIG. 1 is a perspective view of a frequency doubler in accordance with the present invention.
Figure 2:
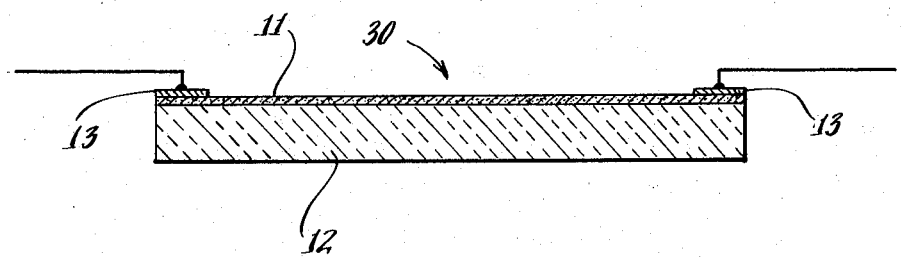
FIG. 2 is a cross sectional view of the plate shown in FIG. 1.

Attention is now directed to FIG. 1 and FIG. 2 wherein the frequency doubler in accordance with the present invention is illustrated. The frequency doubler generally numerically designated as 10 in FIG. 1 comprises a ferromagnetic device 30 which is constructed by depositing a ferromagnetic film of magneto-anisotropic resistive material 11 on a substrate of suitable non-conductive material 12. The ferromagnetic film may be deposited on the substrate by conventional means well known in the art such as by evaporation or sputtering processes. The ferromagnetic material may be any material that has or demonstrates ferromagnetic anisotropic resistive properties such as iron, nickel, cobalt, and manganese, or alloys of these materials such as permalloy. The substrate may be constructed of any suitable non-conducting material which gives mechanical strength to the ferromagnetic film deposited thereon. Substrate material includes glass and quartz.

As illustrated in FIG. 1 and FIG. 2, along two opposite edges of the magnetic film 11 a good electrical conductor 13 such as gold is deposited on top of the film 11. This conducting material 13 provides a uniform electrical ohmic contact to the film.

As illustrated in FIG. 1, the device 30 is located in the X-Y plane and is immersed in a magnetic field H whose direction changes in the same plane. This magnetic field H may be generated by any conventional electronics technique which is characterized by the absence of moving mechanical parts. Further, the strength of magnetic field need only be enough to magnetize or saturate the film 11 of device 30. In this configuration device 30 will sense any change in direction of the applied magnetic field and due to the anisotropic properties of the ferromagnetic material, an output is produced as the direction of the magnetic field changes. Since the field strength necessary to magnetize the film is small, from about 5 to 20 gauss, coils of wires may be used to generate the required field, thereby avoiding the necessity of using large cumbersome electro-magnets or permanent magnets.

An example of introducing a rotating magnetic field without the use of magnets mounted on a rotating shaft is illustrated in FIG. 1. As shown in FIG. 1, the film is immersed in a rotating magnetic field provided by two coils 15 and 16 wrapped around the film 11 and which are in electrical and space quadrature. The coils 15 is electrically connected to input terminals 17 which are adapted to be connected to a signal generator 20 which provides an alternating current having frequency $f_1$. The input terminals 17 are also electrically connected to coil 16 which are arranged orthogonal or 90° to coil 15. The signal in coil 16 is processed through a conventional 90° phase shifter 21.

The two output leads are electrically connected to conducting strips 13 and to output terminals 25. A constant current DC source 26 is placed between these output leads. The constant current DC source may be any conventional source which may be approximated by a resistor ($R >> R_{film}$) in series with a DC power supply. The output signal appearing across the output terminals 25 is at twice the frequency, $2f_1$, of the input signal and the amplitude of the output signal is directly proportional to the magnitude of the impressed DC current and to the magnitude of the magneto-resistive effect in the film.

The theory of operation is based on the spatial resistive anisotropy in a ferromagnetic film. This anisotropy is manifest by a difference in resistivity, $\rho$, measured when the film is magnetized parallel to the impressed current direction and when the sample is magnetized in the same plane but at right angles to the current direction. These resistivities are designated as $\rho_1$ and $\rho_2$ respectively. D.K. Wu has shown in the Bulletin of Academic Sciences U.S.S.R., Physics Series 29 at page 581, published in 1965, that for ferromagnetic film magnetized to saturation parallel to the plane Z=0 as shown in FIG. 1, $$E_x = (\rho_1 \cos^2 \phi + \rho_2 \sin^2 \phi)J \quad (1)$$

where J is the current density, uniform and parallel to the X axis and $\phi$ is the angle between the X axis and H, the applied magnetic field. When the film is magnetized to saturation, the angle $\phi$ also refers to the saturation magnetization vector, M, since the vector directions of M and H are coincident. The resistivities $\rho_{1s}$ and $\rho_{2s}$ are material constants and subscript, s, indicates saturation. It also has been shown that $$\Delta\rho_s = \rho_{1s} - \rho_{2s} = \alpha M_s^2 \quad (2)$$

It follows from equations (1) and (2) that the voltage at the output terminals, the arrangement shown in FIG. 1, is given by $$V_{output} = 1/2 I_{dc} \Delta R_s \cos 4\pi f_1 t \quad (3)$$

where $\Delta R_s$ is the resistance anisotropy. Thus, an input signal at frequency $f_1$ will be directly converted into a signal at twice the frequency, $2f_1$, at the output terminals of the device. The amplitude of the output signal is directly proportional to magnitude of the impressed DC current and to the magnitude of the magneto-resistive effect of the film. In addition, since $R_s$ is proportional to $M_2^2$ the amplitude of the output signal will remain constant with applied input signal level. For values of applied field, H, greatly in excess of $M_s$, ferromagnetic films have been reported to exhibit negative magneto-resistance, that is, there is a decrease in resistance at these high levels of applied field. Thus, the device will not only perform the function of a frequency doubler but it will also function as an amplitude limiter. Based on the state of the art values of switching speed in magnetic films, the device should continuously double the input frequency range extending from sub-audio to the VHF region.

The ferromagnetic resistance anisotropy described above differs in character from the resistance anisotropy observed in non-ferromagnetic materials. For a nonmagnetic material, the voltage at the output terminals is given by $$V_{output} = 1/2 I_{dc} \Delta R \cos 4\pi f_1 t \quad (4)$$

where $\Delta R$ is proportional to $B^2$, the square of the magnetic induction. This output signal is at twice the frequency of the input signal, as in the case of the ferromagnetic film, but the amplitude of the output signal is proportional to the level of the input drive signal. For the ferromagnetic film, the amplitude remains constant with input drive levels greater than that required for saturation of the film.

Frequency doublers as described hereinbefore have been constructed with films of various sizes, ranges from 0.004 × 0.004 inch to 0.5 × 0.5 inch, with the thickness of the films ranging from 300 to 1,500 angstroms. In the doublers so constructed a 100 Hz sinusoidal and 600 KHz sinusoidal drive signal was applied to the input terminals which yielded a 200Hz and 1,200 KHz output signal respectively.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What is claimed is:

1. The combination comprising:
  a. a film of ferromagnetic material having anisotropic magneto-resistive properties wherein the resistive value changes dependent on the direction of a magnetic field in the plane of said film;
  b. first means for causing a flow of electric current in the plane of said film from one edge to another edge of said film;
  c. second means for producing a magnetic field in the plane of said film;
  d. third means for rotating said second means causing the resistance of said film to vary; and
  e. output means electrically connected to said film and responsive to said changes in resistance of said film for producing an output signal.

2. Apparatus for producing a constant amplitude sinusoidal output signal the frequency of which is twice the frequency of an input signal comprising:
  a. a film of ferromagnetic material having anisotropic magneto-resistive properties;
  b. first means for causing a flow of electric current in the plane of said film from one edge to another edge of said film;
  c. second means for producing a magnetic field in the plane of said film;
  d. third means for rotating said second means causing the resistance of said film to vary producing an output signal at twice the rotation rate; and
  e. output terminal means for obtaining said output signal so that said output signal may be applied to a utilization device.

3. The apparatus of claim 2 wherein said second means includes two coils of conducting wires wrapped around said film and oriented orthogonal to each other.

4. The apparatus of claim 3 wherein said third means includes a 90° phase inverter electrically connected between said coils, said phase inverter having input terminals so that an input signal may be applied.

5. The apparatus of claim 4 wherein said film is a permalloy.

6. The apparatus of claim 4 wherein the magnetic field strength is between about 5 and 20 gauss.

7. A frequency doubler comprising:
  a. a substrate;
  b. a film of ferromagnetic material positioned on one surface of said substrate, said film having anisotropic magneto-resistive properties;
  c. first means for causing a flow of electric current in the plane of said film from one edge to another edge of said film;
  d. two coils of wires wrapped around said film oriented orthogonal to each other, said coils being in space and electrical quadrature;
  e. a 90° phase inverter electrically connected between said coils;
  f. input terminals electrically connected to said coils and being adapted to receive an external input signal at frequency $f_1$ for producing a rotating magnetic field in the plane of said film, said magnetic field changing the resistive properties to produce output signal $2f_1$; and
  g. output terminal means for obtaining said output signal so that said output signal may be applied to a utilization device.

8. The apparatus of claim 7 wherein said magnetic field is between about 5 and 20 gauss.

9. The apparatus of claim 7 wherein said film is permalloy.

* * * * *